Sept. 17, 1940.    G. S. BRAUN    2,215,029
MULTIVOLTAGE SADIRON
Filed April 3, 1939
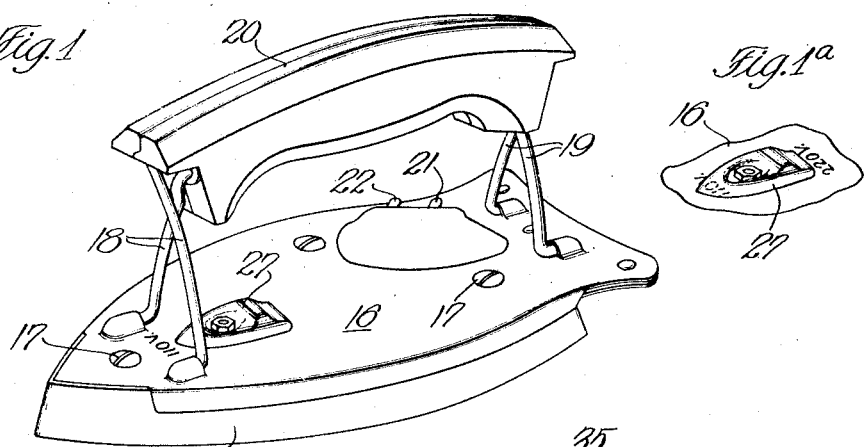
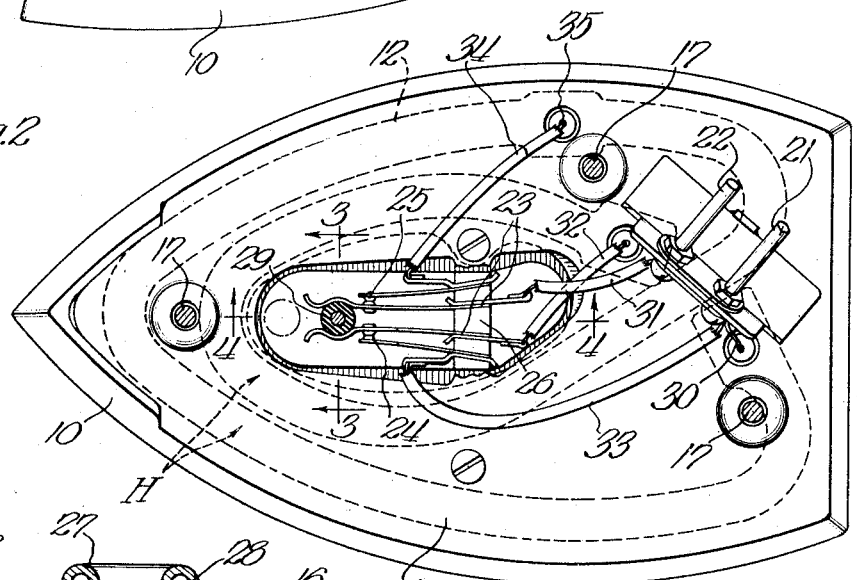
INVENTOR.
Gwilym S. Braun
BY Bair & Freeman
ATTORNEYS Patented Sept. 17, 1940

2,215,029

UNITED STATES PATENT OFFICE 2,215,029

MULTIVOLTAGE SADIRON

Gwilym Stanley Braun, Strasburg, Ohio, assignor to Knapp-Monarch Company, St. Louis, Mo., a corporation of Missouri Application April 3, 1939, Serial No. 265,658

4 Claims. (Cl. 219—25)

An object of my invention is to provide a multivoltage sadiron of simple, durable and inexpensive construction.

A further object is to provide a sadiron which can be connected with either a 110-volt circuit or a 220-volt circuit and which in either case will utilize the same heating element and operate it at full efficiency without any danger of overheating on the higher voltage.

A further object is to provide the sadiron with a heating element having a center tap and a series-parallel switch mounted in the sole plate and normally assuming a position for connecting the two halves of the heating element in series with each other, the switch being movable to its other position when a spreader element coacts with the switch, whereupon the two halves of the heating element are connected in parallel for 110-volt instead of 220-volt energization.

A further object is to provide an operating device or knob for the switch, which knob is conveniently mounted on the exterior of the iron, such as the cover plate for the heating element and sole plate and which can be slid from one position to another, indicia being provided to indicate for which voltage the switch is set.

With these and other objects in view, my invention consists in the construction, arrangement and combination of the various parts of my device whereby the objects contemplated are attained, as hereinafter more fully set forth, pointed out in my claims and illustrated in the accompanying drawing, in which:

Figure 1 is a perspective view of a multivoltage sadiron embodying my invention;

Figure 1a is a fragmentary view of a portion thereof showing a control knob in a different position;

Figure 2 is a plan view of the sole plate with a first cover plate mounted thereon and all parts above the first cover plate removed and the holddown screws therefor shown in section;

Figure 3 is an enlarged sectional view on the line 3—3 of Figure 2;

Figure 4 is a sectional view on the line 4—4 of Figure 2, and

Figure 5 is an electrodiagrammatic view of the heating element supply terminals and switch of my multivoltage sadiron.

On the accompanying drawing I have used the reference numeral 10 to indicate a sole plate. The sole plate 10 has a groove 12 formed therein adapted to receive a heating element H. The heating element H may comprise a coiled resistance wire 13 and refractory insulation 14 therefor.

A first cover plate 15 is provided for the sole plate 10 and the heating element H. This plate is surmounted by a second cover plate 16 and the two are held in position on the sole plate by screws 17. The usual handle supports 18 and 19 and a handle 20 are mounted on the cover plate 16 for manipulating the sadiron.

A pair of terminals 21 and 22 are provided for supplying current to the heating element H. I also provide a series-parallel switch consisting of a pair of leaf spring contacts 23 constituting a first switch and third and fourth contacts 24 and 25 for coaction therewith, as shown in Figure 2. The leaf springs 23 are suitably connected to an insulating support 26 and are normally engaged with each other, as shown in Figure 5.

For operating the series-parallel switch 23—24—25, I provide a knob 27 slidably mounted with respect to a slot 28 in the cover plate 16. Below the cover plate a post or spreader element 29 is connected to the knob 27. The spreader element 29 is made of insulation and is adapted to be moved from the position of Figure 5 to the solid line position of Figure 2. Such movement separates the contacts of the springs 23 from each other and engages them with the contacts 24 and 25. This results in a change from a series circuit of Figure 5 to a parallel circuit of Figure 2.

To accomplish the desired series-parallel circuit connections, the terminal 21 is connected by a wire 30 to one end of the heating element H. The terminal 22 is connected by a wire 31 to one of the spring contacts 23. The other spring contact is connected by a wire 32 to the other end of the heating element. A wire 33 also connects the terminal 21 to the contact 24, while a wire 34 connects a center point 35 of the heating element to the contact 25. The series circuit can be traced through the elements of Figure 5 as follows: From 21 through 30, H, 32, 23, 23, and 31 to 22. The parallel circuit can be traced in Figure 2 is follows: First parallel circuit from 21 through 30, one-half of H, 35, 34, 25, 23, and 31 to 22. Second parallel circuit from 21 through 33, 24, 23, 32, the other one-half of the heating element, 35, 34, 25, 23, and 31 to 22.

In connection with the knob 27, I provide a pair of indicia indicated as 110-v. and 220-v. The indicium 110-v. is located so that it is uncovered when the knob is in the position for parallel connections, as in Figure 2, with the indicium 220-v. at that time being covered by the heel of the knob, as in Figure 1. Reversely, when the knob is in the position of Figure 5 for series circuit operation, the indicium 110-v. is covered and 220-v. uncovered, as in Figure 1a. I am thus able to provide a simple switch construction which is inexpensive to manufacture and readily operable and when in either of its positions clearly indicates what current value should be applied to the iron.

Although I have described my invention in connection with a sadiron, it is obvious that it can be used in connection with other electric appliances in which it is desirable to have a heating element that can be connected with either one of two voltages. This is particularly desirable in connection with appliances that can be carried to foreign countries, where available voltages are quite often different from those prevailing throughout the United States.

Having described one specific embodiment of my invention together with the operation thereof, I desire it to be understood that this form is selected merely for the purpose of facilitating disclosure of the invention rather than for the purpose of limiting the number of forms which it may assume. It is to be further understood that various modifications, adaptations and alterations may be applied to the specific form disclosed to meet the requirements of practice without in any manner departing from the spirit and scope of the present invention except as set forth in the claims appended hereto.

I claim as my invention and desire to secure by Letters Patent of the United States:

1. In a multivoltage sadiron, a sole plate, a heating element therefor, a cover for said sole plate and heating element, a pair of current supply terminals for said heating element, one of said terminals being directly connected with one end of said heating element, a first switch normally connecting the second of said terminals with the other end of said heating element, second and third switches, and means for opening said first switch and closing said second and third switches, said second and third switches being operable to connect said other end also of said heating element with said first terminal and an intermediate point of said heating element with said second terminal, said means for operating said switches comprising a two position knob mounted on said cover and a pair of indicia on said cover for said knob, one indicium being covered thereby when the knob is in one of said positions and the other being covered thereby when said knob is in the other of said positions.

2. In an electric appliance, a heating element having a center tap, a pair of supply wires for said heating element, a series-parallel switch connected with the ends of said heating element, with said center tap and with said supply wires and means for changing said switch from one position with the two halves of said heating element connected in series to its other position with the two halves of said heating element connected in parallel and vice versa, said means including a switch operating element, indicator means associated therewith, an indicium-bearing member, and a pair of indicia thereon, one indicium being covered by said indicator means when said switch is in one position, and the other indicium being covered by said indicator means when said switch is in its other position.

3. In a multivoltage sadiron, a sole plate, a heating element therefor and having a center tap, a pair of terminals for said heating element, a series-parallel switch connected with the ends of said heating element, with said center tap and with said terminals, a cover for said sole plate and heating element and means for changing said switch from one position with the two halves of said heating element connected in series to its other position with the two halves of said heating element connected in parallel and vice versa, said means including a knob movable on said cover plate and a pair of indicia on the cover plate for the knob, one indicium being covered by the knob when in one of its positions and the other indicium being covered thereby when the knob is in its other position.

4. In an electric appliance, a heating element, supply wires for said heating element, a switch connected with said heating element and with said supply wires, and means for changing said switch from one position with two portions of said heating element connected in series to its other position with the two portions connected in parallel and vice versa, said means including a switch operating element, indicator means associated therewith, an indicium-bearing member, and indicia thereon, part of said indicia being obscured by said indicator means when said switch is in its other position.

GWILYM STANLEY BRAUN.